United States Patent
Nyman et al.

(10) Patent No.: US 7,494,640 B1
(45) Date of Patent: Feb. 24, 2009

(54) HYDROGEN PEROXIDE MODIFIED SODIUM TITANATES WITH IMPROVED SORPTION CAPABILITIES

(75) Inventors: May D. Nyman, Albuquerque, NM (US); David T. Hobbs, North Augusta, SC (US)

(73) Assignee: Sandia Corporaion, Albuquerque, NM (US)

( * ) Notice: Subject to any disclaimer, the term of this patent is extended or adjusted under 35 U.S.C. 154(b) by 652 days.

(21) Appl. No.: 11/169,859

(22) Filed: Jun. 29, 2005

(51) Int. Cl.
*C01G 23/00* (2006.01)
*B01J 20/04* (2006.01)

(52) U.S. Cl. ..................... 423/598; 502/400
(58) Field of Classification Search .............. 423/598; 502/400
See application file for complete search history.

(56) References Cited

U.S. PATENT DOCUMENTS

| | | | |
|---|---|---|---|
| 4,156,646 | A | 5/1979 | Schulz |
| 4,511,455 | A | 4/1985 | Dosch |
| 4,929,582 | A | 5/1990 | Dosch |
| 5,015,453 | A | 5/1991 | Chapman |
| 5,461,022 | A | 10/1995 | Dosch |
| 5,885,925 | A | 3/1999 | DeFilippi |
| 6,110,378 | A | 8/2000 | Anthony |
| 6,268,307 | B1 | 7/2001 | DeFilippi |
| 6,479,427 | B1 | 11/2002 | Anthony |

OTHER PUBLICATIONS

Bonino et al., "Ti-Peroxo Species in the TS-1/H2O2/H2O System," 2004, J. Phys. Chem. B, 108, pp. 3573-3583.*
Pikaev et al., "Radiation chemistry of aqueous solutions of actinides," 1997, Russian Chemical Reviews, 66 (9), pp. 763-788.*
M.J. Barnes, T.B. Edwards, D.T. Hobbs, K.M. Marshall, Strontium and Actinite Removal Testing with Monosodium Titanate and Other Sorbents, WSRC-TC-2001-00436, Oct. 29, 2001, NTIS.
D.T. Hobbs, M.D. Nyman, Preparation and Use of Dried Monosodium Titanate, WSRC-TR-2003-00546, National Technical Information Service, 2003.
D. Hobbs, M. Duff, M. Nyman, A. Clearfield, E. Maginn, Strategic Design and Optimization of Inorganic Sorbents for Ce, Sr, and Actinides, WSRC-MC-2003-00344, May 7, 2003, NTIS.
D.T. Hobbs, M.D. Nyman, A. Clearfield, Tailoring Inorganic Sorbents for SRS Strontium and Actinide Separations: Optimized Monosodium . . . , WSRC-TR-2004-00322, Jul. 2004. NTIS.
D.T. Hobbs, M.D. Nyman, A. Clearfield, Inorganic Based Ion Exchange Materials for Radiochemical Separations, The CSRA Chemist, vol. 47, No. 3, Sep. 2004. (abstract).

(Continued)

*Primary Examiner*—Wayne Langel
*Assistant Examiner*—Brittany M Martinez
(74) *Attorney, Agent, or Firm*—Robert D. Watson (57) ABSTRACT

The sorption capabilities (e.g., kinetics, selectivity, capacity) of the baseline monosodium titanate (MST) sorbent material currently being used to sequester Sr-90 and alpha-emitting radioisotopes at the Savannah River Site are significantly improved when treated with hydrogen peroxide; either during the original synthesis of MST, or, as a post-treatment step after the MST has been synthesized. It is expected that these peroxide-modified MST sorbent materials will have significantly improved sorption capabilities for non-radioactive cations found in industrial processes and waste streams.

6 Claims, 7 Drawing Sheets

OTHER PUBLICATIONS

D. Hobbs, M. Duff, M. Nyman, A. Clearfield, E. Maginn, Strategic Design and Optimization of Inorganic Sorbents for Ce, Sr, and Actinides, EMSP-81949-2002, Jun. 1, 2002.

D.T. Hobbs, et al., Evaluation of New Inorganic Sorbents for Strontium and Actinide Removal from High-Level Nuclear Waste Solutions, ACS mtg. OSTI Identifier 825836, Mar. 28, 2004.

Hobbs, D. T. et al., "Evaluation of Alternate Materials and Methods for Sr and alpha Removal form SRS High-Level Waste Solutions", WSRC-TR-2000-00229 2000.

Nakamura, R. et al., "In Situ FTIR Studies of Primary Intermediates of Photocatalytic Reactions on Nanocrystalline TiO2 Films in Contact with Aqueous Solutions", *J. Am. Chem. Soc. 2003*, vol. 125 2003, 7443-7450.

Nakamura, R. et al., "Primary Intermediates of Oxygen Photoevolution Reaction on TiO2 (Rutile) Particles, Revealed by in Situ FTIR Absorbtion and Photoluminescence Measurements", *J. Am. Chem Soc. 2004*, vol. 126 2004, 1290-1298.

* cited by examiner

HYDROGEN PEROXIDE MODIFIED SODIUM TITANATES WITH IMPROVED SORPTION CAPABILITIES

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to the use of inorganic sorbent materials, and methods of synthesis, for sequestering radioactive waste products, such as strontium ($^{90}$Sr), and alpha-emitting actinides, such as americium ($^{241}$Am), plutonium ($^{238}$Pu, $^{239}$Pu, $^{240}$Pu), and neptunium ($^{237}$Np).

Nuclear materials production in the United States has produced large amounts of highly radioactive wastes. Wastes stored at the Savannah River and Hanford sites exhibit high alkalinity and high ionic strength. Cost effective disposal of the high-level nuclear wastes requires highly efficient radiochemical separations processes. Ion exchange materials have shown promise to separate fission products (e.g., cesium and strontium) and actinide elements (e.g. plutonium and neptunium) from the high-level waste solutions prior to disposal.

Monosodium titanate (MST) is an inorganic, amorphous, poorly crystalline, hydrous metal oxide sorbent material that exhibits high selectivity for strontium and alpha-emitting actinide radioisotopes, even in the presence of strongly alkaline and high sodium-containing salt solutions. The Savannah River Site (SRS) identified MST for removal of strontium and plutonium isotopes from high-level radioactive waste solutions in the early 1980s as part of the In-Tank Precipitation process. In 2000, the Department of Energy (DOE) selected MST for the strontium/actinide separation step. Original development of MST at Sandia National Laboratory (SNL) produced a dried powder. Unpublished studies conducted by L. L. Kilpatrick and D. T. Hobbs during the 1980s indicated that air-drying of the MST at elevated temperature (e.g., >100° C.) adversely impacted strontium removal performance. Principally due to the poorer sorption characteristics of MST dried at elevated temperature, procurement of MST for the In-Tank Precipitation (ITP) process at SRS specified that the vendor prepare and isolate the material without drying, and then deliver the MST to the Westinghouse Savannah River Company (WSRC) as an aqueous slurry containing 15 to 20 wt % MST solids.

Conventional synthesis of sodium titanate, $HNaTi_2O_5$, involves reacting a titanium isopropoxide and sodium hydroxide in a molar ratio of 2 to 1. (See, e.g., U.S. Pat. No. 4,156,646, "Removal of Plutonium and Americium from Alkaline Waste Solutions", to Schulz.) The titanium isopropoxide is added to the sodium hydroxide-methanol solution with stirring. Hydrolysis is done by pouring the titanium isopropoxide+sodium hydroxide mixture into an acetone-water solution containing 8.5% water by volume; one liter of the acetone-water solution being required for each mole of titanium hydrolyzed. The hydrolyzed material is coarse, and can be easily filtered to a 50 micron frit.

Disadvantages of using MST as slurry include the possibility of a chemical spill from a leak in the storage containers or transfer lines, and the cost of additional equipment needed to suspend or maintain suspension of MST solids in the slurry. Advantages of using MST as a dry powder include more precise control of MST quantity, potential longer chemical shelf life, no possibility of liquid spills, lower transportation costs, and smaller storage footprint.

Recent tests by the authors have confirmed the earlier work that air-drying of the MST slurry at elevated temperature (>100° C.) adversely impacts the kinetics of strontium and alpha removal performance (i.e., air-dried MST sorbs more slowly). However, we discovered that air-drying at 100 C did not significantly affect the MST particle morphology or the sorbent's capacity. See "Preparation and Use of Dried Monosodium Titanate", D. T. Hobbs, M. D. Nyman, Westinghouse Savannah River Company technical report WSRC-TR-2003-00546, which is incorporated herein by reference.

It is well known that the permanent clean up and disposal of radioactive wastes is a very expensive process. Any improvements in the MST sorbent's capacity and/or kinetics could significantly reduce these costs. However, due to the regulatory process, and other concerns, in order to successfully replace the current baseline sorbent (MST slurry) with an improved sorbent, significant increases in performance will need to be shown. Against this background, the present invention was developed.

SUMMARY OF THE INVENTION

The sorption capabilities (e.g., kinetics, selectivity, capacity) of the baseline monosodium titanate (MST) sorbent material currently being used to sequester Sr-90 and alpha-emitting radioisotopes at the Savannah River Site are significantly improved when treated with hydrogen peroxide; either during the original synthesis of MST, or, as a post-treatment step after the MST has been synthesized. It is expected that these peroxide-modified MST sorbent materials will have significantly improved sorption capabilities for non-radioactive cations found in industrial processes and waste streams.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

We define the term decontamination factor (DF) as a unitless ratio between the initial concentration of a target radionuclide (before contacting with the sorbent) and the final concentration of the radionuclide (after contacting with the sorbent), after a fixed amount of time (e.g., 168 hours). The concentration can be measured in decay units (i.e. curies). The terms chemically-modified MST, hydrogen peroxide-modified MST, peroxide-activated MST, peroxotitanate, and peroxide-modified MST are used interchangeably herein. The terms MST, monosodium 10 titanate, and sodium titanate are used interchangeably herein. The terms baseline MST and un-modified MST are used interchangeably herein. The words particles, powders, and solids are used interchangeably herein.

Monosodium titanate (MST) is a white, inorganic, amorphous, poorly crystalline sodium titanate sorbent material that exhibits high selectivity for sorbing strontium and actinide radioisotopes, even in the presence of strongly alkaline and high sodium-containing salt solutions. The Savannah River Site (SRS) currently uses MST slurry for removing Sr-90 and alpha-emitting radionuclides from high-level radioactive waste solutions. Here, we refer to the MST sorbent material selected by SRS as baseline MST or un-modified MST. The general composition of baseline MST slurry is:

$HNaTi_2O_5 \cdot xH_2O$ where $x \sim 2\text{-}4$

The physical form of the baseline MST currently in use at the SRS is aqueous MST slurry with a MST solids concentration of 150-200 g/L (15-20 wt %). Additional specifications for the baseline MST slurry include: pH (minimum of 10), alcohol content (500 ppm max.), total organic carbon (100 ppm max.), total inorganic carbon (100 ppm max.), total halides (100 ppm max.) and particle size.

The current specifications for baseline MST on particle size are 1) the fraction of particles <1 vol % for sizes <1 micron; and 2) the fraction of particles <1 vol % for sizes >35 micron. In other words, 98% of the baseline MST particle sizes are greater than 1 micron and less than 35 microns.

The MST specification for particle size distribution was established many years ago when SRS planned to use MST within a 1.3 million gallon waste tank. The specifications continue to remain, although processing is now planned in much smaller tanks. The limit on the larger particle size was adopted to reduce settling rates to aid in retrieving the solids from the large processing tank. With processing now planned to occur in smaller tanks, this specification is not as important. The specification on the small end was adopted to control the quantity of small particles that could plug the pores of the filter membranes used to separate the MST solids from the decontaminated waste solution. Plugging the membrane pores will lead to reduce filter flux and impact throughput in the processing facility. We have reduced the membrane pore size on the filters planned in the processing facilities. In principle, this could allow the use of smaller particles without a major impact on filter flux.

An older specification required the MST slurry to contain small amounts of sodium hydroxide and sodium nitrite as corrosion inhibitors. While some of our experiments used this older version, the SRS currently no longer requires the vendor to add these corrosion inhibitors to the slurry.

Figure 1:
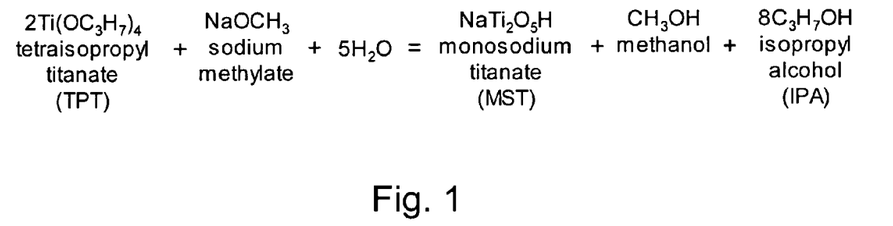
FIG. 1 shows a chemical reaction describing the synthesis of the baseline MST.

FIG. 1 shows a chemical reaction for synthesizing MST slurry. MST solids typically exhibit a 20-25 wt % volatile portion, as determined by thermogravimetric analysis (TGA) measurements. The baseline MST slurry is about 30 wt % solid, 30 wt % solution, and the balance water; wherein the solution comprises 0.01 M NaOH and 0.01 M $NaNO_3$. As it turns out, we discovered, unexpectedly, that the percentage of volatile portion in the hydrogen peroxide treated/synthesized samples turned out to be an important compositional variable that correlated well with improved sorption properties.

The following description is the laboratory procedure developed at SRNL (Savannah River National Laboratory) for synthesizing baseline MST slurry.

Standard Laboratory Procedure for Synthesizing Baseline MST Slurry

A. Basis:
  66.7 gm 15 wt % Monosodium Titanate (MST) slurry (10.0 gm MST solids)

B. Equipment:
  300 mL 3-neck Reaction Flask with agitator,
  Condenser,
  Heating mantle,
  3—Variable Speed Pumps
  3—Flowmeters,
  4—150 mL Graduated Cylinders C. Chemicals:
  tetraisopropyl titanate (TPT) 30.0 mL
  isopropyl alcohol (IPA) 154.3 mL
  25 wt % (4.4M) sodium methylate 11.6 mL
  deionized water for reaction 4.05 mL
  deionized water for final wt % adjustment ~55-57 mL D. Procedure:
1. Prepare 120 mL of Solution #1 by mixing the chemicals as listed below in the order shown.
   Solution #1 Mix (v/v):
     65.3% IPA
     9.7% sodium methylate ($NaOCH_3$)
     25.0% TPT
2. Prepare 32.5 mL of Solution #2 by mixing the chemicals as listed below in the order shown.
   Solution #2 Mix (v/v):
     87.5% IPA
     12.5% water
3. Charge 47.5 mL IPA into the reaction flask.
4. With agitation, charge 0.5 mL of Solution #2, followed by 2.0 mL of Solution #1 below liquid level into the reaction flask to initiate precipitation.
5. Agitate reaction mix for a minimum of ten minutes to initiate precipitation of monosodium titanate (MST) solids.
6. With agitation, charge simultaneously and below liquid level remaining 118 mL of Solution #1 at a flow rate of 4.0 mL/minute and 32 mL of Solution #2 at a flow rate of 1.0 mL/minute. Adjust the flow rate of solutions as necessary to maintain constant conductivity or good particle morphology as viewed under the microscope.
7. After addition of both solutions is complete, heat the reaction slurry to boiling (ca. 82° C.) and distill off the alcohol to a maximum alcohol concentration in the liquid phase of <500-ppm. If necessary, alcohol can be removed by successive decantations and additions of deionized water.
8. After alcohol removal is complete, cool the slurry to ambient temperature and add sufficient quantity of deionized water to adjust the MST solids level to 15 wt %. Check the slurry pH, and adjust if necessary to pH ≧10 with aqueous caustic soda (NaOH) solution.

9. Package and store the final MST slurry in a sealed polyethylene container. Do not let the solids dry out. In the absence of dehydration, the product shelf life may be indefinite.

Peroxide-Modified MST

Our general approach for improving the sorption capabilities of MST was based on using hydrogen peroxide ($H_2O_2$) as a mineralizer. The original thought behind this strategy was to modify the rate and mechanism of sodium titanate precipitation in order to obtain materials with greater long-range order (more like a closely-related material, sodium nonatitanate, SNT), or to obtain a material that was more finely dispersed. This approach was supported by studies indicating that SNT, with its increased long-range order, has better sorption capabilities than MST. See Hobbs, 2000, WSRC-TR-2000-00229, *Evaluation of Alternate Materials and Methods for Sr and alpha Removal from SRS High-Level Waste Solutions*, which is incorporated herein by reference. We also thought that a more finely-dispersed sorbent would have an increased surface area that should also have improved sorption capabilities.

As the result of our work, the materials that we synthesized in the presence of $H_2O_2$, or modified post-synthesis with $H_2O_2$, have shown remarkable improvement in radionuclide sorption selectivity, kinetics and capacity; especially for plutonium and neptunium. However, the specific mechanisms responsible for these improvements appear to be different than what we originally thought would be responsible (e.g., increased long-range order and greater surface area were not as important as were expected).

According to the present invention, the performance (e.g., kinetics, selectivity, capacity) of baseline MST can be significantly improved by treating the MST with hydrogen peroxide; either during the synthesis of MST, or, as a post-treatment step. We have discovered that our peroxide-modified MST has up to two orders of magnitude greater decontamination factors over the baseline MST slurry on everything tested so far (plutonium, uranium, strontium, neptunium, protactinium, and americium). Furthermore, it is known that MST is an excellent sorbent for a variety of other cationic metals, such as: Ag, Pd, Zr, Mo, Sr, Cs, Rb, Ba, La, Cd, Rh, U, Ru, Fe, Cr, Ni, Gd, Pr, Eu, Y, Sm, Nd, and Ce. We expect that the peroxide-modified MST will also show improved sorption characteristics for many of these metals as well.

Next, we will present examples of six different general methods that can be used to produce peroxide-modified MST sorbent materials with improved properties.

Method #1 (Alcohol-Based Synthesis with $H_2O_2$)

Dissolve a titanium alkoxide and a sodium alkoxide in a solvent; then gradually add hydrogen peroxide and water to the solvent mixture, and stir until a yellow, precipitate forms. Then, recover the yellow precipitate by, for example, vacuum filtration. After recovery, the solids can be washed, for example, 2-3 times with deionized water (or other suitable solvent) to remove any unreacted hydrogen peroxide, soluble salts, etc. Then, after washing, the yellow solids (comprising peroxide-modified MST) can be dried in air at room temperature.

Some examples of titanium alkoxide compounds that can be used include: titanium methoxide, titanium ethoxide, titanium isopropoxide, titanium propoxide, and titanium butoxide. Equivalent names for titanium isopropoxide ($C_{12}H_{28}O_4Ti$) include: tetraisopropyl orthotitanate, titanium tetraisopropylate; tetraisopropyl titanate; isopropyl titanate; titanium isopropoxide; titanium(IV) i-propoxide; tetraisopropoxytitanium(IV)~tetraisopropyl orthotitanate; titanium iso-propylate; orthotitanic acid tetraisopropyl ester.

Some examples of sodium alkoxide compounds that can be used include: sodium methoxide ($NaOCH_3$), sodium methylate (same as sodium methoxide), sodium ethoxide, sodium propoxide, and sodium butoxide. Some examples of solvents that can be used include: alcohols that are miscible in water, such as: isopropyl alcohol, methanol, ethanol, propanol, butanol, and isopropanol.

In one embodiment, the proportions of ingredients used in Method #1 can be:
- 5-10 wt % titanium alkoxide;
- 0.5-1.5 wt % sodium alkoxide;
- 5-10 wt % hydrogen peroxide;
- 5-10 wt % water; and
- 60-80 wt % alcohol;

wherein the Ti:Na ratio in the final product is about 2:1.

In another embodiment, the proportions of ingredients used in Method #1 can be:
- 8 wt % titanium isopropoxide
- 1 wt % sodium methoxide
- 8 wt % hydrogen peroxide;
- 8 wt % water; and
- 75 wt % isopropanol.

Example of Method #1

Figure 2:
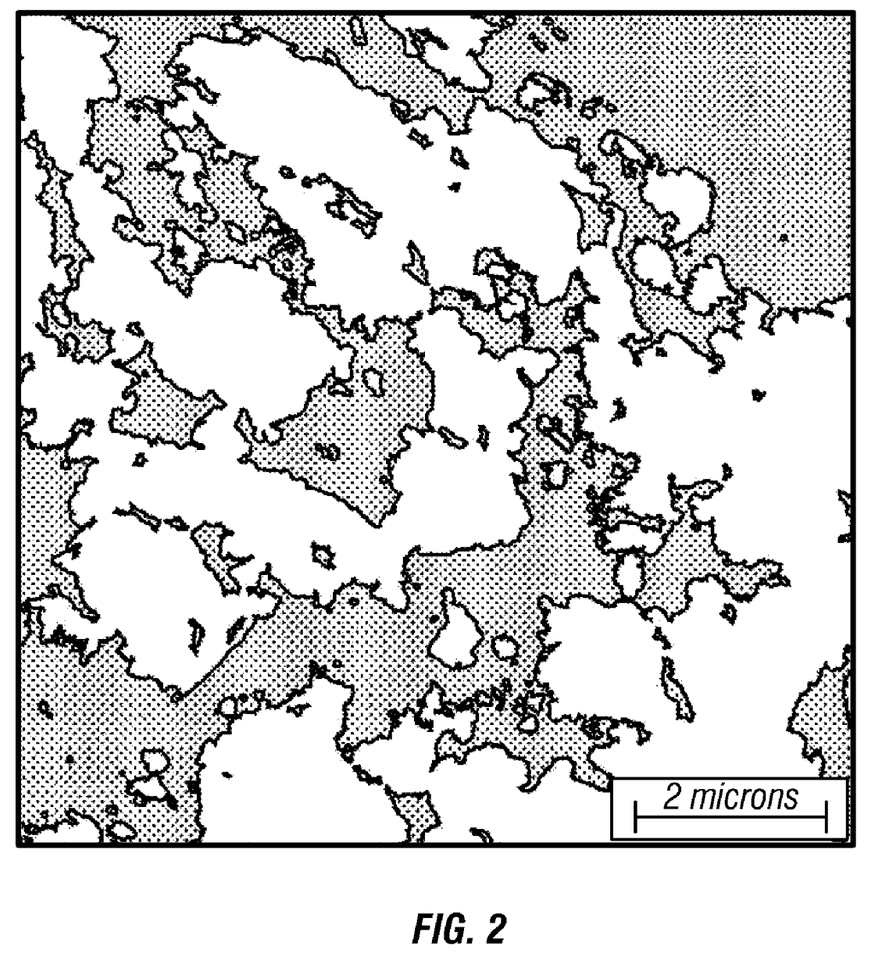
FIG. 2 shows a SEM image of a peroxide-modified MST sample # LN1-8b, the best sorbent for Np uptake; synthesized by hydrolysis and condensation of alkoxides in the presence of $H_2O_2$, according to the present invention.

The sample designated LN1-8b was synthesized according to the alcohol-based, first method. Titanium isopropoxide (1 g, 3.52 mmol) and sodium methoxide (0.095 g, 1.76 mmol) were combined in a vial in an Argon-filled glove box. The vial was capped and removed from the glove box. Isopropanol (9 ml) was added and the mixture was sonicated until the alkoxides dissolved and a clear solution was obtained. One ml of water plus 1 ml of $H_2O_2$ 30 wt % solution were combined in a vial and added to the isopropanol solution. A yellow precipitate (comprising peroxide-modified MST) formed immediately. The solution was stirred overnight at room temperature. The following day the precipitated solids were collected by vacuum filtration, then washed 2-3 times with DI water, and finally dried in air at room temperature. The yield of peroxide-modified MST solids was 0.48 grams. SEM images of LN1-8b are shown in FIG. 2.

Method #2 (Aqueous-Based Synthesis with $H_2O_2$)

Heat an aqueous alkaline solution (e.g., NaOH or KOH). Then, add a source of titanium (e.g., titanium alkoxide). Then, gradually add hydrogen peroxide and stir until the titanium alkoxide dissolves. Keep adding hydrogen peroxide until yellow precipitates form. Then, recover the solids by vacuum filtration. This peroxide-modified titanate material is very fibrous, has a high surface area, and has very good sorption behavior for Sr and the tested actinides.

Example of Method #2

Figure 3A:
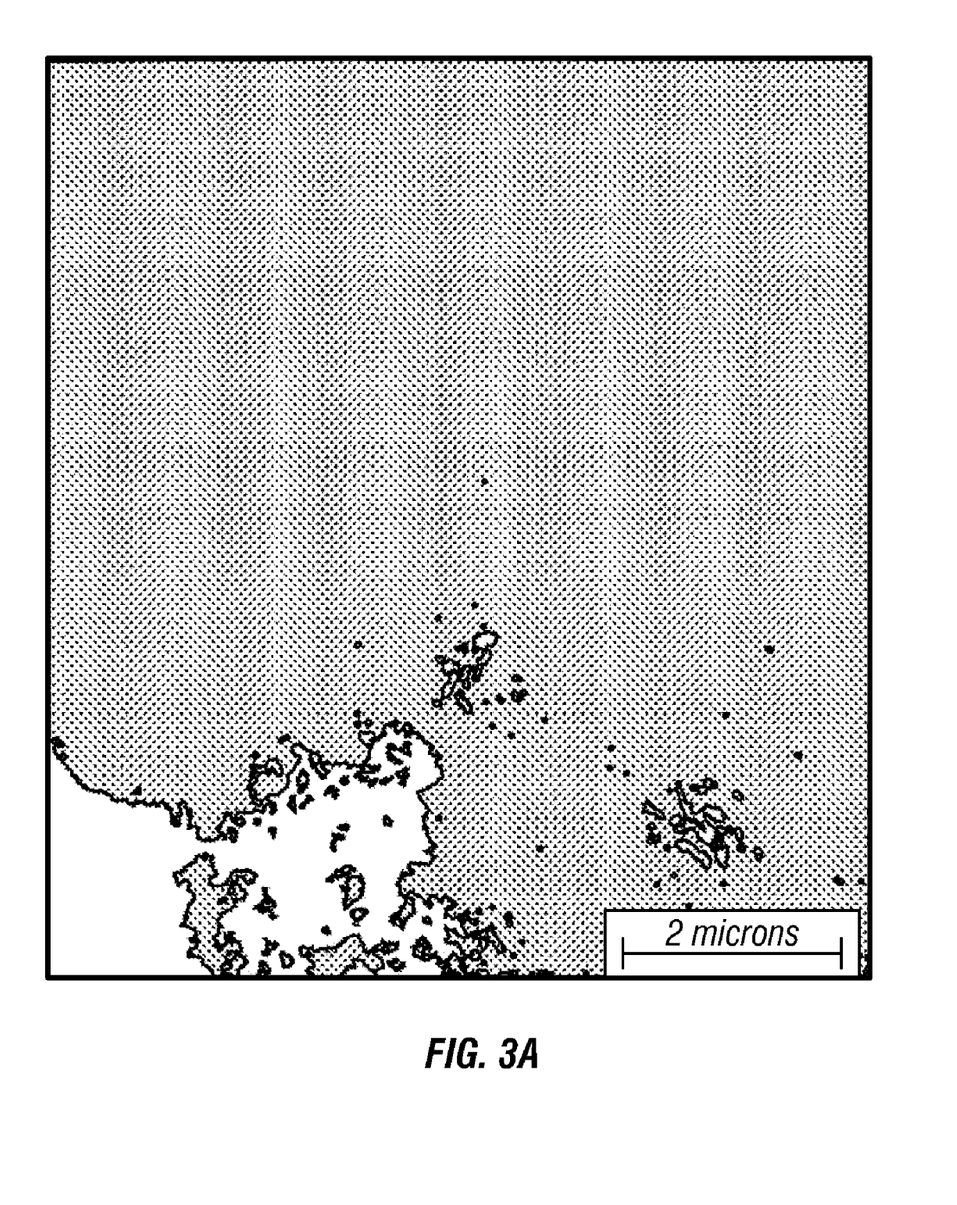
FIG. 3A shows a SEM image of a peroxide-modified MST sample synthesized by the aqueous-synthesis route, according to the present invention.
Figure 3B:
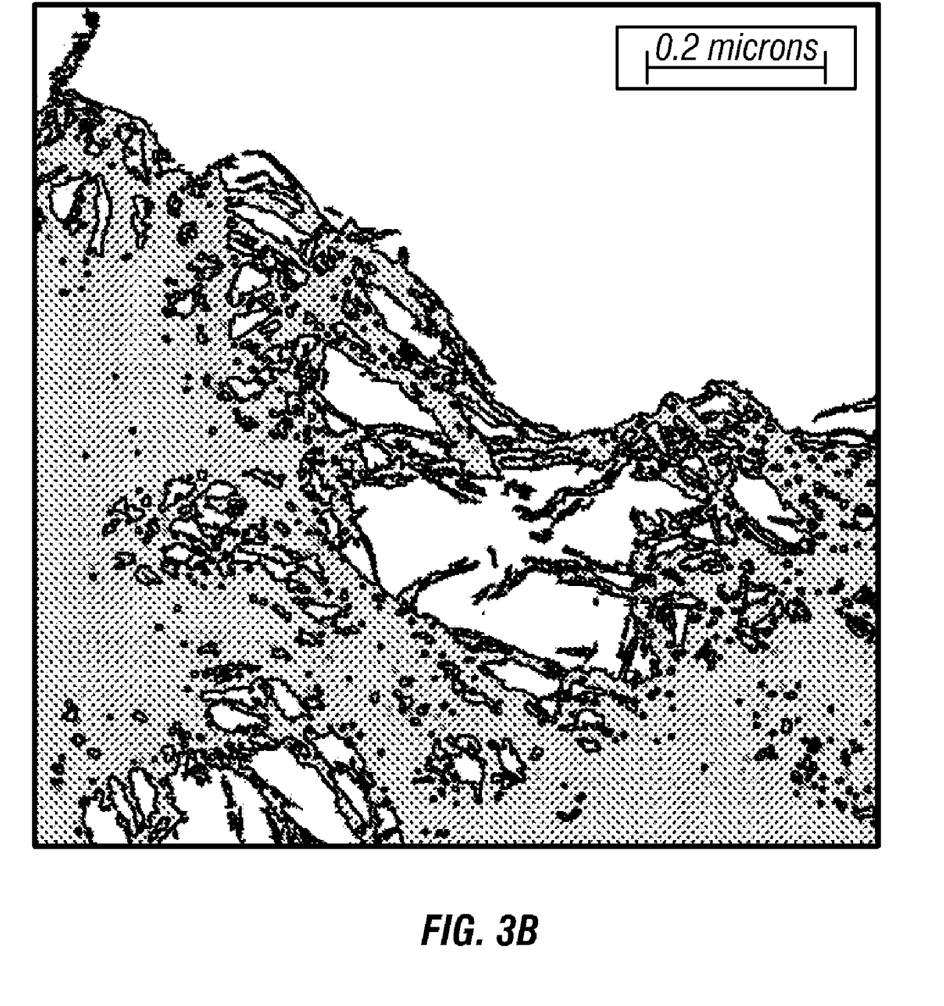
FIG. 3B shows a TEM image of a peroxide-modified MST sample synthesized by the aqueous-synthesis route, according to the present invention.

A sample of peroxide-modified MST was synthesized according to the aqueous-based second method. First, 150 ml of a 3 molar NaOH solution was heated and to about 60° C., and stirred. Then, 16 grams of titanium isopropoxide was added drop wise to the heated NaOH solution until a white precipitate formed. Then, an aqueous solution of 30 wt % hydrogen peroxide was slowly added, while continuing to heat and stir, until a clear, bubbly, yellow solution formed at about 30 grams of hydrogen peroxide solution. The solution continued to be heated and stirred until yellow precipitates formed. Then, the yellow solids were collected by vacuum filtration, washed, and air-dried at room temperature. SEM and TEM photos of this sample are shown in FIGS. 3A and 3B. This material appears very fibrous, and has a high surface area. Optionally, after the yellow solids are collected by vacuum filtration, washed, and air-dried at room temperature; then the dry solids can be re-suspended in water; and then the pH of the water-solid mixture can be adjusted to ph 4 to acidify the mixture; followed by vacuum filtering and washing the acidified solids.

An alternate version of method #2 can use a different source of titanium, $TiCl_4$, instead of titanium isopropoxide. This method comprises: 1) place $TiCl_4$ solution in a flask with an acidic solution (e.g., 0.09 molar $TiCl_4$ in 20% HCl solution), 2) add hydrogen peroxide in a 1:1 to 10:1 ratio of $H_2O_2$ to Ti (preferably a ratio of about 3:1), then 3) add NaOH solution (e.g., a 3 molar solution) until a yellow precipitate comprising peroxide-modified MST forms, followed by collecting the solids by vacuum filtration.

Method #3 (Treating Dry MST Powder with Hydrogen Peroxide)

First, vacuum-dry baseline MST slurry at room temperature. Then, treat the MST solids overnight at room temperature by contacting the solids with a $H_2O_2$ solution (which may be pH neutral; or basic by adding NaOH solution ($\leq$0.1 M); or acidic by adding HCl solution ($\leq$0.4 M)). The peroxide-modified MST solids are then recovered by vacuum filtration, then washed, and air-dried at room temperature.

In one embodiment of the third method, the vacuum-dried monosodium titanate solids are vacuum-dried at an elevated temperature, e.g., 55 C. In another embodiment, 16 ml of deionized water and 20 drops of 30 wt % $H_2O_2$ solution are mixed with every 1 gram of vacuum-dried MST. In another embodiment, NaOH solution can be added to increase the pH of the mixture, or, HCl can be added to decrease the pH of the mixture, as needed.

Example of Method #3

Figure 4:
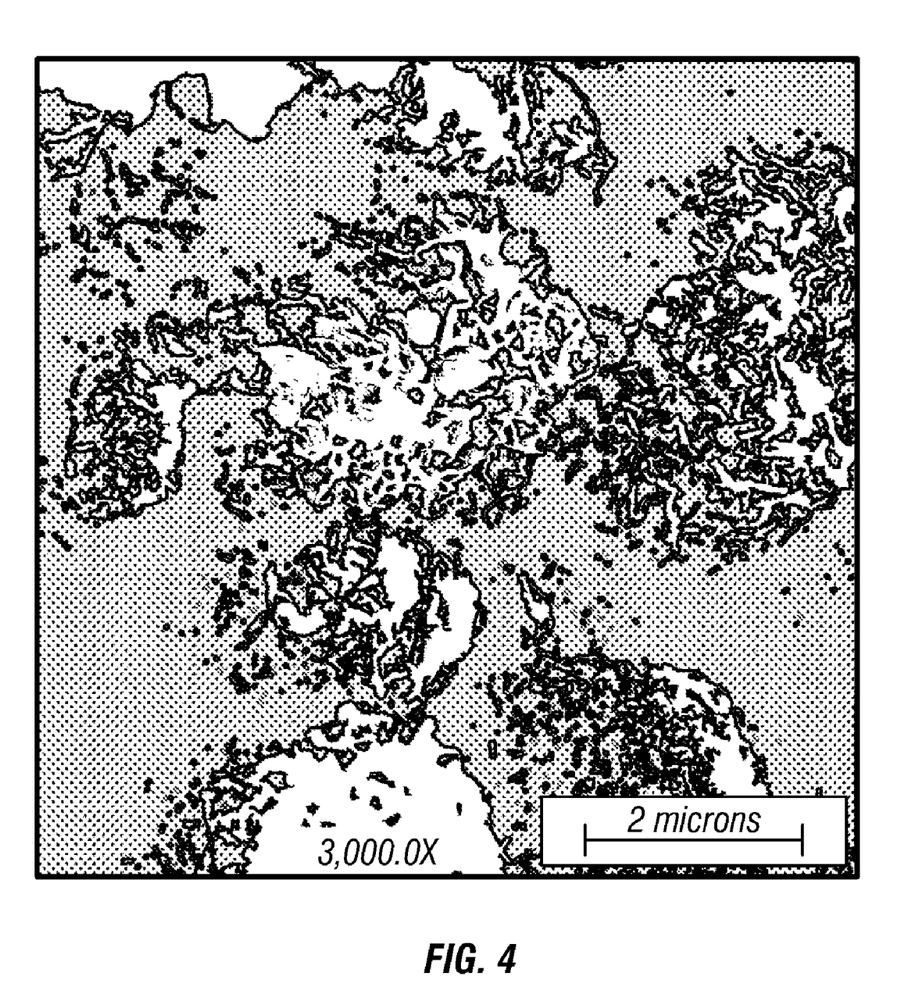
FIG. 4 shows a SEM image of a peroxide-modified MST sample # NETL-14, the best sorbent for Pu uptake; synthesized by peroxide treatment of vacuum-dried MST in a neutral solution, according to the present invention.

The sample designated NETL-14 was synthesized according to method #3. First, 0.5 grams of baseline MST, which had been previously vacuum dried at 55° C. (see WSRC-TR-2003-00546, "Preparation and Use of Dried Monosodium Titanate") was placed in 8 ml of deionized (DI) water, along with ten drops of 30 wt % $H_2O_2$ solution. The mixture was then stirred overnight at room temperature. The next day the precipitated solids were collected by vacuum filtration, washed 2-3 times with DI water, and dried in air at room temperature. Note: we used the MST that had been vacuum dried at 55 C, because this was the only dried MST that we had readily available at the time. SEM images of NETL-14 are shown in FIG. 4.

Method #4 (Treating MST Slurry with $H_2O_2$)

This method is attractive because the MST particles are never dried out, which eliminates that extra step in the process. In one embodiment, the first step is to adjust the pH of baseline MST slurry to be between 2 and 11 by adding a base or acid (e.g., NaOH or HCl). Then, add $H_2O_2$ to treat and modify the MST solids in the slurry.

In another embodiment, method #4 comprises:
a) providing a slurry comprising monosodium titanate (MST) particles suspended in water;
b) adjusting the pH of the slurry to between 2 and 11;
c) adding hydrogen peroxide to the slurry and stirring, whereby the MST particles are modified by the hydrogen peroxide;
d) recovering the peroxide-modified MST particles by filtering the slurry;
e) washing the peroxide-modified MST solids to remove any unreacted hydrogen peroxide and by-products, without allowing the particles to dry out; and
f) re-suspending the peroxide-modified MST solids in water to make a peroxide-modified MST slurry.

Specifically, from about 0.2 to about 5 grams of 30 wt % hydrogen peroxide solution can be added in step e) for every 1 gram of monosodium titanate solids provided in step a). Optionally, after step f) the pH of the final peroxide-modified MST slurry can be adjusted to between 2 and 7 by adding, for example, $HNO_3$ to the final slurry.

The peroxide-modified MST sorbents produced by the various methods described above have a distinctive and readily identifiable yellow color. In particular, the color is bright yellow if synthesized or treated under acidic conditions; while the color is a pale yellow if synthesized under basic conditions.

In general, the first, second, and third methods produce dry powders; while the fourth method produces a slurry. Of course, the filtered peroxide-modified MST solids can subsequently be re-suspended in water to make a new slurry at any time, as needed. More detailed descriptions and analyses of the peroxide-modified MST sorbents produced by the first two general methods are described next. The first general method allowed us to vary the composition and chemistry of the synthesized sorbents, whereas the second general method provided a method where the chemistry, composition and morphology were essentially fixed, but could be varied one parameter at a time and to any extent that is desired.

The third and fourth general methods were valuable for determining which materials characteristics are most important in influencing radionuclide sorption selectivity, capacity and kinetics; since the baseline MST slurry provided a consistent baseline that could be altered in a very controlled fashion. The first method does not provide as much control, since changing one synthetic parameter will likely change numerous materials characteristics simultaneously. However the first method was valuable because once we determined which materials characteristics defined and influenced sorption capabilities; we could best enhance and optimize these characteristics by taking advantage of a synthesis technique that provided more flexibility.

For the alcohol-based and the aqueous-based synthesis methods (e.g., the first and second methods), the ratio of Ti:Na should generally be kept at around 2:1 in the final product.

Note that the phrase "washing the solids" generally means the following: first, the slurry is placed on a filter unit connected to a vacuum line. Then, a vacuum is pulled from beneath the filter, which pulls the supernatant liquid through the filter. The liquid, referred to as filtrate, is collected and typically discarded. The solids collect on the surface of the filter and are typically referred to as a filter cake. Finally, water (or other solvents could be used) is then added to the top of the filter cake and allowed to flow through the solids to displace the interstitial liquid that remains with the moist solids. This water-washing step may be repeated several times, so that the remaining interstitial liquid becomes essentially that of the washing fluid, versus that of the initial supernatant liquid.

We investigated the following variations on the synthesis and treatment methods:
  Acidic, basic or neutral conditions for synthesis or MST treatment;
  Concentration of acid or base in synthesis or MST treatment;
  Temperature of synthesis or MST treatment (room temperature or hydrothermal processing); and
  Vacuum dried or filtered; and air-dried as a final processing step The general composition of peroxide-modified MST sorbent, according to the present invention, is:

$$HNaTi_2O_5 \cdot xH_2O \cdot yO_2H_z$$

wherein x=1-5, y=1-5, and z=0, 1, or 2; and wherein the material comprises a volatile portion ranging from about 20 wt % to about 50 wt % (as measured by thermogravimetric analysis (TGA)).

Table 1 shows a summary of synthesis parameters, materials characteristics, and Sr, Np, and Pu decontamination factors (at 168 hours) for a variety of select titanate-based sorbents produced by variations on Methods 1 and 3, described above. (Note: not all entries were completed in Table 1, simply due to judicious decisions of how to focus time, effort and money). Note that in Table 1, the samples denoted "vac dried" or "vd" were recovered from the synthesis or treatment solution by vacuum filtration, followed by vacuum drying at room temperature. Otherwise, the solids were recovered by vacuum filtration and then dried on the filter paper at ambient conditions, without vacuum.

As shown in Table 1, the peroxide-modified MST materials produced by both the first and third methods significantly outperformed the baseline MST slurry for Sr, Np and Pu decontamination factors. We used the step of initial vacuum drying before subsequent treatment (rather than drying in ambient conditions) because, as observed previously (see WSRC-TR-2003-00546), vacuum drying preserved the spherical morphology of the baseline MST particles/solids. The best sorbent for Np (LN1-8b) was produced by the first method, and had a Np decontamination factor about 19 times greater than the baseline MST slurry. The best sorbent for Pu (NETL-14) was produced by the second method, and had a Pu decontamination factor about 66 times greater than the baseline MST slurry. The best sorbent for Sr (LL4-18a) was also produced by the second method, and had a Sr decontamination factor about 7 times greater than the baseline MST slurry. These materials were subsequently characterized in detail; to benchmark, and to identify characteristics that could possibly be correlated with sorption behavior.

A wide variety of physical characterizations were performed on the samples:
  Phase identification, or qualification of crystallinity, by powder X-ray diffraction;
  Approximate Na/Ti content by EDS (energy dispersive spectroscopy);
  Percent volatile content by thermogravimetry (TGA);
  Surface area by $N_2$ adsorption (BET);
  Decontamination factors (DF) for Sr, Np, Pu; and
  Particle morphology by SEM.

Some characterizations and synthesis parameters could be correlated to superior decontamination factors, and are discussed herein. In general, hydrothermal treatment did not improve sorption characteristics (i.e. see LN1-2b) over materials synthesized by precipitation at room temperature, nor did dry heating the dry sorbents (see WSRC-TR-2003-00546). Hydrothermal treatment improves crystallinity or long-range order. In general, we observed that less crystalline materials have better sorption characteristics than materials with more long-range order. This effect has always been attributed to either more surface area in the case of sorption onto a crystallographically defined site (i.e. a zeolite) or more defect sites in the case of surface adsorption. However, LN1-2b, a relatively poor performer with respect to decontamination factors, has higher surface area by around 2-5x than the best-performing materials (i.e. see LN1-8b and LN1-8c). The MST, treated MST, and sodium titanates precipitated from alkoxides that were the most effective sorbents were all poorly crystalline or amorphous.

X-ray diffraction spectra of typical sodium titanate materials were measured. Very poor crystallinity is observed by this analysis. Phases that form from the neutral or basic solutions are identified as SNT, and titania phases precipitated from the reaction carried out under acidic conditions. On the other hand, higher volatile content (wt % H+, $H_2O$, OH⁻ and peroxo species including $H_2O_2$, $O_2^{2-}$ and $HOO^-$ in cases where $H_2O_2$ is utilized) seems to be correlated with good sorption capabilities, and LN1-2b has relatively low volatile content. Again this could be a direct reflection of surface defects, and available sorption sites on a surface by proton exchange, for instance. Every other sample for which we have decontamination factor values are peroxide-treated and therefore we cannot make a judgment of the effect of volatile species on sorption capabilities, independent of the effects of peroxo species on sorption capabilities.

Most of the decontamination factor values reported are for peroxide-modified MST materials. We determined that sodium titanates synthesized in the presence of hydrogen peroxide, or baseline MST vacuum dried and post-treated with hydrogen peroxide, are superior sorbents to baseline MST slurry, particularly for actinide sorption (Np and Pu). Later discussions will address the mechanism or role the peroxide plays in either sorbent modification or the actual sorption process. Present discussions pertain to the variation in syntheses parameters within the set of peroxide-treated or peroxide-synthesized materials.

For the peroxide-modified MST materials that were synthesized from alkoxides in isopropanol at room temperature, both those with NaOH solution added to hydrolyze and condense the alkoxides, as well as those with $H_2O$ added to hydrolyze and condense the alkoxides out-performed or performed as well as the MST slurry for Sr, Np and Pu sorption (see LN1-8b, LL4-30a, LN1-8c, LL4-31b). We have yet to test the analogous materials where the alkoxides are hydrolyzed and condensed by addition of an acidic solution. By comparing the 168 hr decontamination factors of LN1-8b to LL4-30A and LN1-8b to LL4-31b, we learn that the means by which the powder sorbent is separated from its 'wet' synthesis mixture and dried has a significant effect on the sorption behavior. The sorbents that were collected by vacuum filtration and dried at room temperature (LN1-8b, LN1-8c) performed better than the samples that were collected by vacuum filtration and dried at room temperature in a vacuum oven (LL4-30A and LL4-31b).

The materials characteristics that can be linked to vacuum drying the sorbent as a final processing step (vs. drying the sorbent at ambient conditions as a final processing step) include surface area and amount of volatile component measured by weight percent. The surface area of LL4-31b (vacuum dried) has about half the surface area of LN1-8b (ambient dried). We can also compare TGA and surface area characterization of MST that has been vacuum dried (MST-vacuum dried) to MST dried at ambient conditions (MST).

The vacuum drying decreases the volatile content by approximately half (31% for ambient dry vs. 15% for vacuum dry), but the decrease in surface area is not so dramatic (24% for ambient dry vs. 20% for vacuum dry).

In conjunction with these discussions, we can also compare the Sr, Np and Pu decontamination factors for LN1-66c, NETL-14 and MN11-7a. These three samples were all prepared by some variation of peroxide treatment of vacuum dried MST. The MST for LN1-66c was initially vacuum-dried at 55° C. followed by peroxide treatment and dried at ambient condition as a final processing step. The MST for NETL-14 was initially vacuum dried at room temperature followed by peroxide treatment and dried at ambient condition as a final processing step. MN11-7a was also initially vacuum dried at room temperature, but vacuum dried as a final processing step, following the peroxide treatment. All these materials have better Decontamination factors for Sr, Np and Pu than the MST slurry standard. Surprisingly, the MN11-7a has the best Sr decontamination factor of the three samples, but not as good Np and Pu. The NETL-14 has the best Pu decontamination factor, but not as good Np and Sr decontamination factor as LN1-66c.

Figure 5:
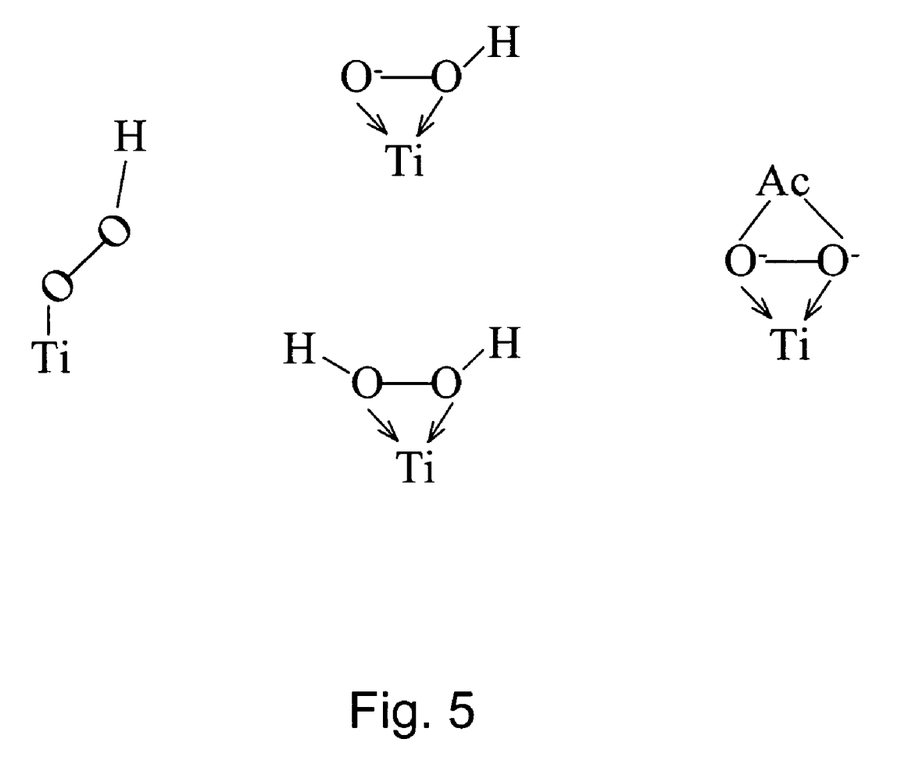
FIG. 5 shows a schematic of several possible binding modes of peroxo species to Ti, and peroxo binding to actinide (Ac).

The peroxide-modified MST sorbent materials of the present invention comprise a volatile portion of about 20-50 wt %, and more likely 30-50 wt %, based on analysis of TGA data. For comparison, the baseline, untreated MST material has a volatile portion of about 20-25 wt %. One possible reason that the peroxide-modified MST samples have a wider range of volatile portions is because our synthesis methods vary. For instance, a sample that is synthesized under acidic conditions, or post-treated with an acid, has a larger volatile content. Many of the peroxide-modified MST samples have a distinguishable, sharp weight loss event around 500-600 C; but only in the case of a basic or neutral synthesis (the sharp drop goes away with acid treatment). You can observe this in the TGA plots of FIGS. 5a and b).

Based on these results, and those described above regarding the peroxide-modified MST materials precipitated from alkoxides, it is clear that vacuum drying the titanate-based sorbents as a final processing step decreases sorption capabilities; particularly actinide sorption. However, it is not quite clear why MN11-7a Sr decontamination factor improves with vacuum drying as a final step. Perhaps since it is not as selective for actinide sorption, it has more sites available for Sr sorption. Finally, its Sr decontamination factor is not that much different than that of LN1-66c that was dried in ambient conditions as a final processing step. It is also not presently understood why an initial step of vacuum drying the MST at elevated temperature (LN1-66c) results in better Pu sorption and worse Np sorption than an initial step of vacuum drying the MST at room temperature (NETL-14). Again, the Np and Pu sorption may have an inverse relationship, based on number of available sites that are selective for each type of sorbate.

Also worthy of discussion here is comparing the decontamination factors for the series of acid-peroxide treated MST, acid-treated MST, and base-peroxide treated MST; all having been initially vacuum dried at room temperature before the peroxide treatment. Summary of observations include: 1) vacuum drying as a final step in the case of the base-peroxide treated MST (MN11-8a) diminished actinide sorption but increased Sr sorption. 2) acid vs. base vs. neutral-peroxide treatment of MST are all somewhat comparable; i.e. no distinct trends or conclusions can be readily made. 3) LN1-76a and LN1-76c can be directly compared to determine the effect of peroxide treatment (their preparation conditions are identical with the exception of peroxide for LN1-76c). Clearly Sr, Np and Pu Decontamination factors are all superior for the peroxide treated material. 4) for the acid-peroxide treated materials, 0.2 M HCl produces a superior sorbent to 0.01, 0.4 M HCl and 0.1 M HCl.

Thermogravimetric (TGA) analyses were performed for MST treated with acid, base or neutral solutions; with or without hydrogen peroxide. For all samples, there is an initial weight loss at low temperature (below 200° C.) which is likely the loss of molecular water that is physisorbed onto the surface of the material, or intercalated within the 'layers' of the outer fibrous portion of MST. For the peroxide-treated materials, there is a second distinct weight loss step between 500-600° C. in the TGA spectra. This is attributed to loss of the peroxide that is bonded or adsorbed onto the MST as $H_2O_2$, $O_2^{2-}$ or $HOO^-$.

Examination of this peroxide-loss step reveals that amount of peroxide sorbed onto the surface is affected by the pH of the treatment. By comparing the height of this step (in both 5A and 5B), the order of peroxide surface concentration appears to be: basic>neutral>0.01M acid>0.1M acid. In fact, the peroxide loss step is not even discernable for the 0.1 M acidic treatment. On the other hand, the amount of weight loss for the step below 200° C. has the opposite trend: 0.1M acid>0.01M acid~neutral~basic and neutral>basic. These trends may be related to the form in which peroxide is bonded or sorbed. In basic solutions, we expect more peroxide to be in the $O_2^{2-}$ form; and in acidic solutions we expect more peroxide to be in the protonated form. The negative charge of the $O_2^-$ form should make a stronger bond with Ti and therefore we would expect it to volatilize at a higher temperature. In the $H_2O_2$ form, the bond with Ti should be weaker and therefore vaporize at a lower temperature in the TGA experiment. So perhaps in the more acidic samples, we observe the peroxide species being vaporized below 200° C. along with the water species. This could be confirmed with TGA-MS experiments.

We also compared the volatile content of the MST that was vacuum-dried at room temperature to the MST that was dried at ambient conditions. It is clear that vacuum drying removes the protons and molecular water from the sorbent, in that the vacuum dried MST has much less volatile content than the MST that was dried at ambient conditions. This may be a key point in understanding the origin of selectivity in these materials and others. That is, the hydrous species may function to solvate and thus stabilized the sorbates, they may provide exchange sites (protons), or they may simply be indicative of higher surface area for sorption.

Infrared spectroscopy was used in attempt to fingerprint and identify the various peroxo species that are bound to the sodium titanate materials (both treated Baseline MST and the sodium titanates precipitated from alkoxides). FTIR analysis was carried out on a variety of MST, peroxide-treated MST, and $TiO_2$ in order to identify key vibrational modes. Samples for IR analysis were prepared by mixing the titanate material (0.5-1.0 wt %) in a KBr matrix, and pressed into pellets for IR transmission measurements. Additionally, the KBr samples were placed in a vacuum oven overnight at 70° C. and re-analyzed to determine if any of the identified peroxo or aqueous species could be removed by vaporization, thus confirming their identification.

Below ~850 wavenumbers, is a broad and strong adsorption band; attributed to Ti—O lattice vibrations. Two peaks of interest are those between 850 and 950 wavenumbers for all three sets of spectra (A,B,C). These are actually a shoulder on the major adsorption below 850 $cm^{-1}$; and they shift and vary in intensity, depending on the conditions in which the titanate material was formed. Also of interest are the peaks around 1100 and 1200 $cm^{-1}$, which are particularly prominent in the spectra of the HCl-peroxide treated MST (FIG. 6C). Two studies by Nakamura et al. were useful in peak assignments of Ti-peroxo species. [Nakamura, R.; Nakato, Y.; "Primary Intermediates of Oxygen Photoevolution Reaction on $TiO_2$ (Rutile) Particles, Revealed by in Situ FTIR Absorption and Photoluminescence Measurements", *J. Am. Chem. Soc.* 2004, 126, 1290-1298.; Nakamura, R.; Imanishi, A.; Murakoshi, K.; Nakato, Y.; "In Situ FTIR Studies of Primary Intermediates of Photocatalytic Reactions on Nanocrystalline $TiO_2$ Films in Contact with Aqueous Solutions", *J. Am. Chem. Soc.* 2003, 125, 7443-7450.]

Of the doublet peak observed in each sample spectrum between 850-950 $cm^{-1}$, the peak at higher frequency is assigned as belonging to the Ti—O lattice because it is observed in the $TiO_2$ reference, as well as MST that has not been treated with hydrogen peroxide. The lower-frequency peak is assigned as the bending mode of surface Ti-peroxo species that could be Ti—OO, Ti—OOH or Ti—$OOH_2$, and certainly a mixture of all three. It is likely these surface peroxo species are bound to one Ti, rather than bridging two Ti, because the bridging peroxo specie vibrates at a lower frequency (around 750 $cm^{-1}$). Nakamura et al. assign the peaks observed around 1100 and 1200 wavenumbers to be the stretching mode of surface Ti-peroxo species and the peak between 850-950 $cm^{-1}$ to be associated with the bending modes of the Ti-peroxo species.

After treating the samples overnight at 70° C. in a vacuum, these peaks are much diminished in all three samples, suggesting the peroxo species are vaporized upon this treatment. Again, this effect is particularly prominent for the acid-treated MST; suggesting the protons are a part of this surface specie that is observable by infrared spectroscopy (i.e. we are observing the Ti—OOH or Ti—$OOH_2$ species rather than the Ti—OO species). This could be an effect of either the strength of the vibrational mode (i.e. allowed or forbidden) or actual concentrations and types of the surface peroxo species. Protonation of the surface peroxo specie would also aid in its volatility, since the di-protonated peroxo specie is neutral.

It is quite evident from these studies that post-treating baseline MST with hydrogen peroxide (either as a dry powder or slurry) or synthesizing sodium titanate in the presence of hydrogen peroxide to produce peroxide-modified MST significantly improves actinide sorption; and improves Sr sorption in many cases. We have linked this effect to the redox chemistry of $O^{2-}$ and/or the increase in concentration of surface sites for binding metals and/or simply increasing the surface area by some dissolution of titania at the sorbent surface. It is likely a combined effect of all three mechanisms, depending on the sorbate (i.e. redox may be more important for the actinides, while and increased concentration of surface sites may be more important for Sr).

The schematic in FIG. 5 shows several possible modes of binding of peroxo species to Ti, as well as binding of actinide to peroxo. The peroxo ligand, $O_2^{2-}$ can reduce redox active metals such as actinides, perhaps contributing to the driving force of irreversible binding. Further, reduced actinides (i.e. Pu(IV)) are much less soluble in aqueous solutions, which might prevent desorption of the bound and reduced actinide. Additionally, actinides are large metals whose binding to multidentate ligands such as $O_2^-$ should help prevent desorption. While the peroxide treatment of sodium titanate materials had a fairly substantial effect on the Np and Pu Decontamination factors, it also improved the Sr decontamination factors, but by a lesser amount. This effect is more likely caused by the peroxo species simply creating more binding sites on the sorbent surface by dissolution of Ti, creating surface defects, and again, providing a bidentate ligand for favorable and irreversible binding.

Figure 6:
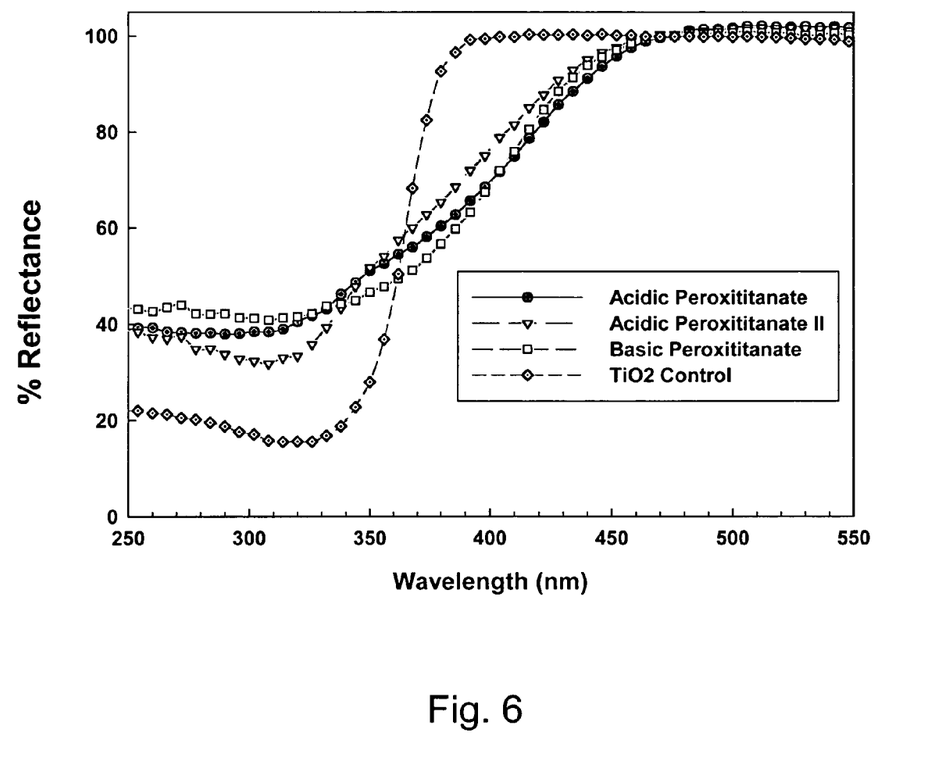
FIG. 6 shows UV-visible diffuse reflectance spectra of two types of peroxotitanate materials, prepared according to the present invention; (compared to $TiO_2$ standard) showing adsorption in the visible region, which gives the peroxotitanate materials their characteristic yellow color.

FIG. 6 shows UV-visible diffuse reflectance spectra of two types of peroxotitanate materials, prepared according to the present invention; (compared to $TiO_2$ standard) showing adsorption in the visible region, which gives the peroxotitanate materials their characteristic yellow color. The measurements were conducted with a Shimadzu UV-Vis 2501 Dual Beam Spectrophotometer equipped with a diffuse reflectance integrating sphere. Powder samples were pressed into aluminum holders for analysis. Both the basic and acidic peroxotitanate materials shown in FIG. 6 were prepared using the aqueous method (method #2). The acidic material was formed by making an aqueous slurry with the yellow powder (pH rises to around 10) and dripping in 1M nitric acid until the pH stabilizes at around 4.

We have identified a variety of chemical treatments of titanate-based sorbents that improve selectivity, kinetics or capacity for the radionuclides of interest (Sr, actinides). Further, sorbent characteristics have been identified that can be correlated with improved sorption behavior. In particular, hydrogen peroxide treatment of the sodium titanate materials has been identified as the most important factor in improving sorption capabilities, especially actinide sorption. This chemical treatment has proved effective for three types of sorbents; MST slurries, dry MST powders and sodium titanates precipitated in the presence of peroxide. It was determined that the peroxide treatment improved titanate sorption capabilities when done in basic, neutral or acidic conditions. In other words, the effect of hydrogen peroxide is very robust and reproducible.

On the other hand, we have shown that even minor changes in the sorbent synthesis or processing conditions results in major changes in the decontamination factors for actinides and strontium. Major changes include pH of solution for sorbent synthesis or sorbent treatment. Minor changes include vacuum drying vs. ambient drying the sorbent as a final processing step to obtain a dry powder. Since the sorption behavior is so sensitive to processing conditions, it is imperative to optimize the sorbent synthesis and processing for baseline sorption of the key actinides and strontium. Our studies have shown that applying heat to the sorbents, either by hydrothermal processing for synthesis or by heat/vacuum drying to obtain the dry power, both result in inferior sorption behavior. In parallel with this observation, we have noted that in general, titanate phases identified as amorphous or very poorly crystalline by X-ray diffraction are superior sorbents. No strong correlation has been made between BET-measured surface area and sorption capabilities.

The best correlation we have made between sorption behavior and a sorbent characteristic is the wt % volatile component, as determined by thermogravimetry. In general, sorbents that have a high volatile content (i.e. for the titanates, greater than 20% by weight) have improved sorption capabilities. In the case of these poorly crystalline to amorphous sorbents, much of the volatile content is derived from surface defect features such as sorbed water, hydroxyls or protons, and peroxo ligands in the case of the peroxide treated material. These surface features may increase sorption capabilities in a number of ways including; surface 'roughening' to create binding pockets for sorbates, providing exchangeable species for sorbates (i.e. protons), or creating strained or coordinatively unsaturated bonds that are subsequently stabilized by sorbate binding. If these surface features are indeed the most important sorbent characteristics linked to sorbate binding, then it is not surprising the sorbent performance is extremely sensitive to processing conditions such as vacuum drying vs.

ambient drying. Further, a process that can reproducibly alter the surface in a favorable way, such as by peroxide treatment, is a important element in optimizing sorption behavior.

In some embodiments of the present invention, the peroxide-modified MST sorbent material may comprise particles of peroxide-modified MST having a particle size distribution such that 98% of the particles have sizes greater than 1 micron and less than 35 microns.

Table 2 shows a summary of synthesis parameters, materials characteristics, and Sr, Np, and Pu decontamination factors (at 168 hours) for a variety of select titanate-based sorbents produced by variations on Method #4, described above. Sets 1 and 2 were tested at phase ratio of solution to sorbent of 2500 mL/g. Set 3 was tested at phase ratio of solution to sorbent of 10000 mL/g. Set 4 was tested at phase ratio of solution to sorbent of 5000 mL/g.

Strontium and actinide removal performance of the samples listed in the Set #1 group showed improved strontium and actinide sorption. In general, the strontium and actinide removal performance improved upon adjustment of the slurry to lower pH values. Preparation of the samples listed in the Set #2 group explored the influence of a number of parameters on the strontium and actinide removal characteristics. Parameters investigated included mole ratio of $H_2O_2$ to titanium, pH, reaction time, and post treatment pH adjustment. For this preparative method, the results indicate that addition of $H_2O_2$ improves strontium and actinide removal performance over a variety of mole ratios. Strontium and plutonium removal improved with increasing mole ratio. Interestingly, neptunium removal decreased with increasing $H_2O_2$:Ti mole ratios. Thus, we conclude that this preparative method allows one to tailor the performance characteristics of the modified MST.

Samples identified as LS-1, LS-2 and LS-3 (see Sets #3 and #4) represent replicate preparations at the same conditions as that used to prepare sample DTH-14 in Set #2, except that the amount of MST treated was increased from 1.5 to 25 grams. Strontium and actinide removal performance testing of these samples show excellent reproducibility among the three samples and good agreement with the sample prepared at the smaller scale. Thus, we conclude that the preparation of peroxide modified MST samples by method #4 is reproducible and can be scaled to a larger batch size.

Method #5 (Synthesizing Baseline MST Slurry, then Treating Slurry with Hydrogen Peroxide)

This method combines the standard, approved method for synthesizing baseline MST slurry, with post-synthesis treatment with $H_2O_2$ using method #4. In one embodiment, method # 5 comprises:

1. Prepare 120 mL of Solution #1 by mixing the chemicals as listed below in the order shown.

Solution #1 Mix (v/v):

65.3% IPA 9.7% sodium methylate (NaOCH3)

25.0% TPT

2. Prepare 32.5 mL of Solution #2 by mixing the chemicals as listed below in the order shown.

Solution #2 Mix (v/v):

87.5% IPA 12.5% water

3. Charge 47.5 mL IPA into the reaction flask.

4. With agitation, charge 0.5 mL of Solution #2, followed by 2.0 mL of Solution #1 below liquid level into the reaction flask to initiate precipitation.

5. Agitate reaction mix for a minimum of ten minutes to initiate precipitation of monosodium titanate (MST) solids.

6. With agitation, charge simultaneously and below liquid level remaining 118 mL of Solution #1 at a flow rate of 4.0 mL/minute and 32 mL of Solution #2 at a flow rate of 1.0 mL/minute. Adjust the flow rate of solutions as necessary to maintain constant conductivity or good particle morphology as viewed under the microscope.

7. After addition of both solutions is complete, heat the reaction slurry to boiling (ca. 82° C.) and distill off the alcohol to a maximum alcohol concentration in the liquid phase of <500-ppm. If necessary, alcohol can be removed by successive decantations and additions of deionized water.

8. After alcohol removal is complete, cool the slurry to ambient temperature and add sufficient quantity of deionized water to adjust the MST solids level to 15 wt %. Check the slurry pH, and adjust if necessary to pH $\geq$ 10 with aqueous caustic soda (NaOH) solution.

8. Filter the slurry, and then wash the MST solids with water to remove any soluble salts, without allowing the MST solids to dry out.

9. Re-suspend the monosodium titanate solids in water to make a second slurry.

10. Adjust the pH of the second slurry to between 2 and 11.

11. Add hydrogen peroxide to the second slurry and mix.

12. Recover the peroxide-modified MST solids by filtering the second slurry.

13. Wash the peroxide-modified MST solids to remove any unreacted hydrogen peroxide, without allowing the solids to dry out.

14. Re-suspend the peroxide-modified MST solids in water to make a peroxide-modified MST slurry.

15. Package and store the final slurry in a sealed polyethylene or polymer-type container. Do not let the solids dry out. In the absence of dehydration, the product shelf life may be indefinite.

Many different combinations and permutations of these methods are possible. In one embodiment, the method may comprise: 1) using $H_2O_2$ during the original synthesis of MST, followed by 2) performing a post-synthesis $H_2O_2$ treatment of the peroxide-modified MST synthesized in step 1). Method #6 is an example of the latter embodiment.

Method #6 (Combines Methods 1 and 4)

First, dissolve a titanium alkoxide and a sodium alkoxide in a solvent; then gradually add hydrogen peroxide and water to the solvent mixture, and stir until a yellow, precipitate forms. Then, recover the yellow precipitate by, for example, vacuum filtration. After recovery, the solids can be washed, for example, 2-3 times with deionized water (or other suitable solvent) to remove any unreacted hydrogen peroxide, soluble salts, etc. Then, after washing, the yellow solids (comprising peroxide-modified MST) can be dried in air at room temperature. Next, treat the MST solids overnight at room temperature by contacting the solids with a $H_2O_2$ solution (which may be pH neutral; or basic by adding NaOH solution ($\leq$0.1 M); or acidic by adding HCl solution ($\leq$0.4 M)). The peroxide-modified MST solids are then recovered by vacuum filtration, then washed, and air-dried at room temperature.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

For example, we have synthesized a sodium vanadate material using the same general peroxide-assisted synthesis method described above. Additionally, we expect that all of the methods presented above can be used to successfully improve the sorption capabilities of a closely-related material, sodium nonatitanate ($Na_4Ti_9O_{20}$).

The scope of the invention is defined by the claims appended hereto.

TABLE 1

Summary of Synthesis, Characterization, and Decontamination Factors of Select Titanate Sorbents

| Sample name | Synthesis | ~Na:Ti ratio (EDS) | Phase (XRD) | % Wt loss by TGA | Measured surface area ($m^2/g$) | Sr DF (168 hr) | Np DF (168 hr) | Pu DF (168 hr) |
|---|---|---|---|---|---|---|---|---|
| | Sodium Titanate/titanate materials synthesized from alkoxides in isopropanol solutions | | | | | | | |
| LN1-2a | Na and Ti alkoxides in isopropanol/HCl RT | 1:81 | Amorphous | 31 | 408 | | | |
| LN1-2b | Na and Ti alkoxides in isopropanol/HCl 150° C. | 1:4 | $H_2Ti_2O_5 \cdot H_2O$ | 8.6 | 117 | 90.9 | 1.4 | 8.81 |
| LN1-2c | Na and Ti alkoxides in isopropanol/$H_2O$ RT | 1:6 | Amorphous | 27 | 12 | | | |
| LN1-2d | Na and Ti alkoxides in isopropanol/$H_2O$ 150° C. | 1:37 | $TiO_2$ | 14 | 84 | | | |
| LN1-2e | Na and Ti alkoxides in isopropanol/NaOH RT | 1:3 | Amorphous | 27 | 43 | | | |
| LN1-2f | Na and Ti alkoxides in isopropanol/NaOH 150° C. | 1:21 | amorphous | 18 | 79 | | | |
| LN1-8a | Na and Ti alkoxides in isopropanol/HCl/$H_2O_2$ RT | no Na | Amorphous | 29 | 5 | | | |
| LN1-16a | Na and Ti alkoxides in isopropanol/HCl/$H_2O_2$ 150° C. | 1:104 | $TiO_2$ | 5 | 66 | | | |
| LN1-8b | Na and Ti alkoxides in isopropanol/$H_2O$/$H_2O_2$ RT | 1:6 | Amorphous | 27 | 53 | 268 | 43.8 | 210 |
| LL4-30A | Na and Ti alkoxides in isopropanol/$H_2O$/$H_2O_2$ RT-vac dried | | | | 187 | 17.7 | 13.7 | |
| LN1-16b | Na and Ti alkoxides in isopropanol/$H_2O$/$H_2O_2$ 150° C. | 1:102 | 'SNT' | 12 | 70 | | | |
| LN1-8c | Na and Ti alkoxides in isopropanol/NaOH/$H_2O_2$ RT | 1:3 | Amorphous | 27 | 22 | 156 | 11.2 | 16.8 |
| LL4-31b | Na and Ti alkoxides in isopropanol/NaOH/$H_2O_2$ RT-vac dried | | | | 12 | 152 | 2.7 | 16.9 |
| LN1-16c | Na and Ti alkoxides in isopropanol/NaOH/$H_2O_2$ 150° C. | 1:5 | 'SNT' | 15 | 29 | | | |
| | Treated Optima MST Materials | | | | | | | |
| | MST slurry standard | | | | 130 | 2.35 | 21.1 | |
| MST-vd | MST vacuum dried, RT | | | 15 | 20 | 177 | 1.91 | 11.5 |
| MST | Filtered and washed salts out, dried at RT | | Amorphous | 31 | 24 | | | |
| LN1-66c | MST vac dried at 55° C. followed by $H_2O_2$ neutral treatment/RT overnight | | | 20 | | 423 | 16.9 | 895 |
| NETL-14 | MST vac dried at RT followed by $H_2O_2$ neutral treatment/RT o'nite | | | | | 229 | 11.3 | 1400 |
| MN11-7a | MST vac dried at RT followed by $H_2O_2$ neutral treatment/RT overnight-vac dried | | | | 8 | 446 | 2.88 | 70 |
| LN1-66d | MST vac dried at 55° C. followed by $H_2O_2$ 0.1 M NaOH treatment/RT overnight | | | 21 | | 294 | 22.7 | 285 |
| MN11-8 | MST vac dried at RT followed by $H_2O_2$ 0.1 M NaOH treatment/RT o'nite-vac dried | | | | | 549 | 1.78 | 91 |
| LN1-76c | MST vac dried at RT followed by $H_2O_2$ 0.1 M HCl treatment/RT overnight | | | 22 | | 441 | 4.74 | 221 |
| LN1-76a | MST vac dried at RT followed by 0.1 M HCl treatment/RT overnight | | | 16 | | 22.9 | 1.31 | 166 |
| LL4-18b | MST vac dried at RT followed by $H_2O_2$ 0.4 M HCl treatment/RT overnight | | | | | 425 | 4.67 | 178 |
| LL4-18a | MST vac dried at RT followed by $H_2O_2$ 0.2 M HCl treatment/RT overnight | | | | 13 | 904 | 16.3 | 325 |
| LN1-76f | MST vac dried at RT followed by 0.01 M HCl treatment/RT overnight | | | 14 | | | | |
| LN1-76c | MST vac dried at RT followed by $H_2O_2$ 0.01 M HCl treatment/RT overnight | | | | 18 | 306 | 9.22 | 18.6 |

The samples indicated 'vac dried' were separated from the synthesis or treatment solution by vacuum filtration, followed by vacuum drying at room temperature. Otherwise, they were separated by vacuum filtration and dried on the filter paper at ambient conditions (without vacuum).

TABLE 2

| Sample ID | Mole Ratio (H$_2$O$_2$:Ti) | pH | Contact Time (h) | pH Adjustment | 4-h Sr DF | 4-h Np DF | 4-h Pu DF | 168-h Sr DF | 168-h Np DF | 168-h Pu DF |
|---|---|---|---|---|---|---|---|---|---|---|
| Set 1 | | | | | | | | | | |
| Optima 00-QAB-417 | n/a | 11.5 | n/a | no | 410 | 1.34 | 5.06 | 263 | 2.19 | 20.1 |
| SRNL-1 | 3 | 11.5 | 24 | no | 36.9 | 1.31 | 20.9 | 60.5 | 2.04 | 33.3 |
| SRNL-2 | 3 | 7 | 24 | no | 88.2 | 1.45 | >131 | >429 | 1.85 | 120 |
| SRNL-3 | 3 | 4 | 24 | no | 354 | 2.21 | >185 | >353 | 2.36 | 274 |
| Set 2 | | | | | | | | | | |
| Optima 00-QAB-417 | n/a | 11.5 | n/a | no | 69.0 | 1.06 | 4.97 | | | |
| Optima 00-QAB-417 | n/a | 11.5 | n/a | no | 64.8 | 0.96 | 5.76 | | | |
| DTH-1 | 3 | 2 | 24 | no | 248 | 1.54 | 124 | | | |
| DTH-2 | 3 | 3 | 24 | no | 220 | 1.78 | 96.5 | | | |
| DTH-3 | 3 | 4 | 24 | no | 222 | 1.85 | 120 | | | |
| DTH-4 | 3 | 5 | 24 | no | 157 | 1.43 | 47.1 | | | |
| DTH-5 | 3 | 6 | 24 | no | 162 | 1.42 | 106 | | | |
| DTH-6 | 3 | 7 | 24 | no | 150 | 1.35 | 119 | | | |
| DTH-7 | 3 | 8 | 24 | no | 122 | 1.60 | 82.0 | | | |
| DTH-8 | 0.3 | 4 | 24 | no | 137 | 4.58 | 37.5 | | | |
| DTH-9 | 1 | 4 | 24 | no | 196 | 2.94 | 94.4 | | | |
| DTH-10 | 6 | 4 | 24 | no | 265 | 1.56 | 52.9 | | | |
| DTH-11 | 3 | 4 | 4 | no | 208 | 1.33 | 83.2 | | | |
| DTH-12 | 3 | 4 | 96 | no | 203 | 1.22 | 127 | | | |
| DTH-13 | 3 | 7 | 24 | yes (pH 2) | 304 | 1.60 | 116 | | | |
| DTH-14 | 3 | 7 | 24 | yes (pH 4) | 243 | 1.97 | 155 | | | |
| DTH-15 | 6 | 4 | 24 | no | 250 | 1.20 | 127 | | | |
| Set 3 | | | | | | | | | | |
| Optima 00-QAB-417 | n/a | 11.5 | n/a | no | 6.19 | 1.19 | 1.73 | | | |
| LS-1 | 3 | 7 | 24 | Yes (pH 4) | 25.0 | 1.36 | 16.5 | | | |
| LS-2 | 3 | 7 | 24 | Yes (pH 4) | 27.5 | 1.81 | 14.1 | | | |
| LS-3 | 3 | 7 | 24 | Yes (pH 4) | 25.3 | 1.51 | 15.6 | | | |
| Set 4 | | | | | | | | | | |
| Optima 00-QAB-417 | n/a | 11.5 | n/a | no | 21.7 | 1.29 | 2.83 | | | |
| LS-1 | 3 | 7 | 24 | Yes (pH 4) | 106 | 1.53 | 73.5 | | | |
| LS-2 | 3 | 7 | 24 | Yes (pH 4) | 101 | 1.45 | 62.0 | | | |
| LS-3 | 3 | 7 | 24 | Yes (pH 4) | 108 | 1.75 | 66.8 | | | |

What is claimed is:

1. A method of synthesizing a peroxide-modified monosodium titanate (MST) sorbent material, comprising:
   a) dissolving a titanium alkoxide and a sodium alkoxide in a solvent to make a solvent mixture;
   b) adding water and hydrogen peroxide to the solvent mixture, and stirring until yellow precipitates form; and
   c) recovering the yellow precipitates, which comprise peroxide-modified MST solids, from the solvent mixture.

2. The method of claim 1, further comprising:
   d) washing the recovered yellow precipitates 2-3 times with deionized water to remove any unreacted hydrogen peroxide; and
   e) drying the washed yellow precipitates in air at room temperature; and
   wherein the recovering step comprises recovering by vacuum filtration.

3. The method of claim 1, wherein the ingredients are combined in the following proportions:
   5-10 wt % titanium alkoxide;
   0.5-1.5 wt % sodium alkoxide;
   5-10 wt % hydrogen peroxide;
   5-10 wt % water; and
   balance solvent;
   wherein the Ti:Na ratio of the yellow precipitates is about 2:1.

4. The method of claim 1, wherein:
   the titanium alkoxide is selected from the group consisting of titanium methoxide, titanium ethoxide, titanium propoxide, and titanium butoxide;
   the sodium alkoxide is selected from the group consisting of sodium methoxide, sodium ethoxide, sodium propoxide, and sodium butoxide; and
   the solvent comprises an alcohol that is miscible in water selected from the group consisting of methanol, ethanol, propanol, butanol, and isopropanol.

5. The method of claim 1, wherein the titanium alkoxide consists essentially of titanium isopropoxide; the sodium alkoxide consists essentially of sodium methoxide; and the solvent consists essentially of isopropanol.

6. The method of claim 5, wherein the ingredients are combined in the following proportions:
   8 wt % titanium isopropoxide;
   1 wt % sodium methoxide;
   8 wt % hydrogen peroxide;
   8 wt % water; and
   balance isopropanol.

* * * * *

UNITED STATES PATENT AND TRADEMARK OFFICE
CERTIFICATE OF CORRECTION

PATENT NO. : 7,494,640 B1
APPLICATION NO. : 11/169859
DATED : February 24, 2009
INVENTOR(S) : May D. Nyman and David T. Hobbs

It is certified that error appears in the above-identified patent and that said Letters Patent is hereby corrected as shown below:

Title Page; item (73);

On the cover page, replace the incorrect Assignee name, "Sandia Corporaion", with the correct name, --Sandia Corporation--

Signed and Sealed this

Twenty-first Day of April, 2009

JOHN DOLL
*Acting Director of the United States Patent and Trademark Office*